United States Patent
Takahashi

[11] Patent Number: 6,067,491
[45] Date of Patent: May 23, 2000

[54] SUSPENSION CONTROL SYSTEM AND METHOD FOR CAB OVER TYPE TRUCK

[75] Inventor: Toru Takahashi, Kanagawa, Japan

[73] Assignee: Unisia Jecs Corporation, Atsugi, Japan

[21] Appl. No.: 09/154,836

[22] Filed: Sep. 17, 1998

[30] Foreign Application Priority Data

Sep. 18, 1997 [JP] Japan ................................. 9-253180

[51] Int. Cl.$^7$ ............................................. B60G 17/015
[52] U.S. Cl. ..................... 701/37; 296/190; 180/89.12; 180/89.13; 180/89.16
[58] Field of Search ................................. 701/37, 38, 39; 296/190, 181; 280/5.5, 423.1; 180/14.1, 14.2, 89.12, 89.13, 89.14, 89.15, 89.16, 89.19

[56] References Cited

U.S. PATENT DOCUMENTS

| | | | |
|---|---|---|---|
| 5,044,455 | 9/1991 | Tecco et al. | 180/89.13 |
| 5,497,862 | 3/1996 | Hoya | 188/282 |
| 5,555,501 | 9/1996 | Furihata et al. | 180/89.12 |
| 5,623,410 | 4/1997 | Furihata et al. | 180/89.13 |
| 5,779,009 | 7/1998 | Iwasaki | 188/299 |
| 5,899,288 | 5/1999 | Schubert et al. | 180/89.12 |
| 5,941,920 | 8/1999 | Schubert | 701/37 |
| 6,000,703 | 12/1999 | Schubert et al. | 180/89.12 |

FOREIGN PATENT DOCUMENTS 5-26521  4/1993  Japan .
7-37864  2/1995  Japan .

*Primary Examiner*—Gary Chin
*Attorney, Agent, or Firm*—Foley & Lardner

[57] ABSTRACT

In suspension control system and method for controlling a damping force characteristic of at least a pair of at least a pair of longitudinally spaced apart positioned shock absorbers located at a cabin of a cab over type truck, a behavior of the cab is detected, a control signal is developed which is to be supplied to a damping force characteristic varying member of each corresponding shock absorber to control the damping force characteristic of the corresponding shock absorber on the basis of a reference control rule which enables optimally a suppression of the vehicle cab behavior under a predetermined vehicle reference condition according to the detected vehicle cab behavior, vibration conditions on at least the longitudinally spaced apart positions of the vehicle cab is detected, a comparison value which is a result of a level comparison between the level of the cab longitudinal direction vibration conditions detected at the step c) of the vehicle cab and that under a reference condition of the cab over type truck is determined, a correction coefficient is developed for the control signal to be supplied to the damping force characteristic varying member of each corresponding shock absorber so as to correct the basic damping force characteristic control for each shock absorber according to the comparison value, and the control signal which is corrected by the correction coefficient is outputted to the damping force characteristic varying member of each corresponding shock absorber.

12 Claims, 13 Drawing Sheets

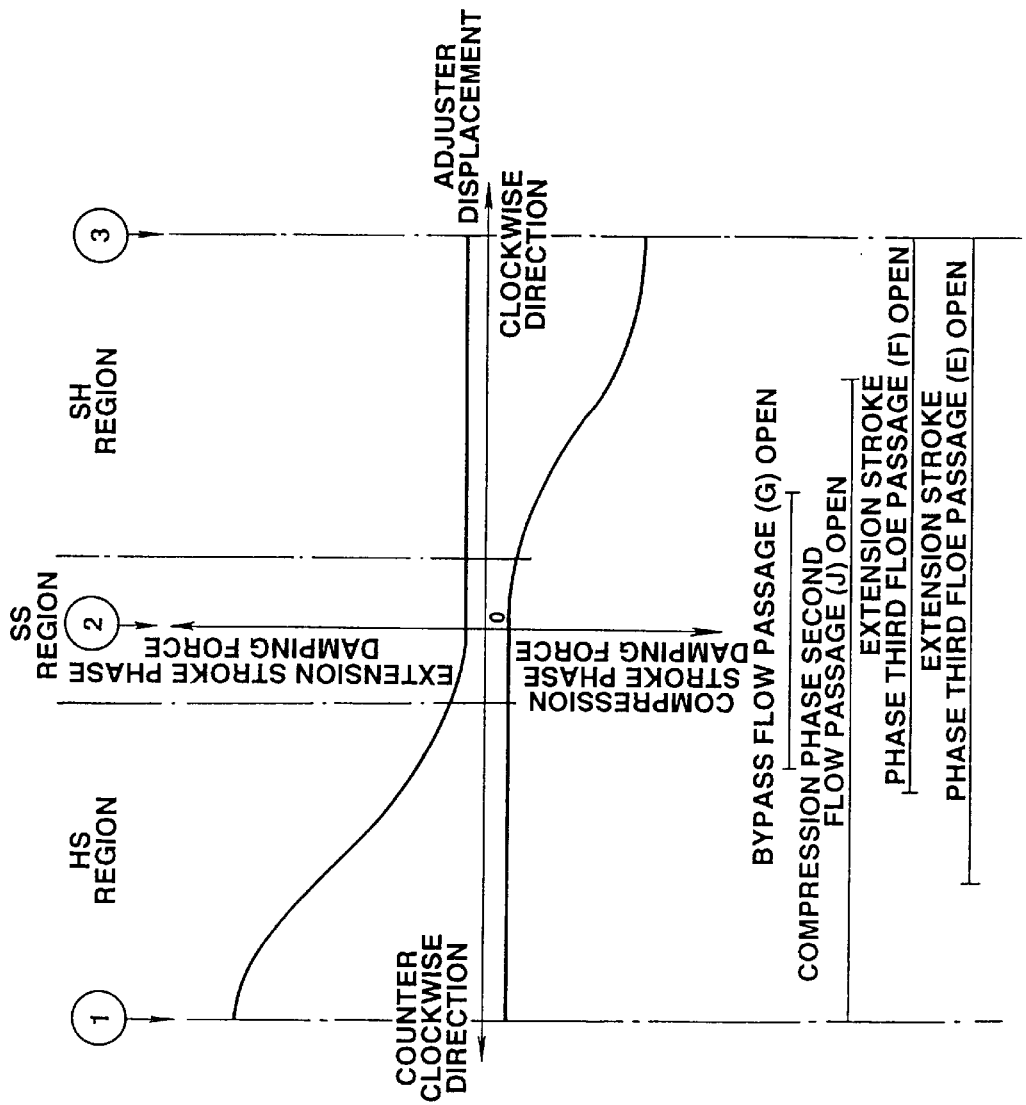

FIG.17C

SUSPENSION CONTROL SYSTEM AND METHOD FOR CAB OVER TYPE TRUCK

BACKGROUND OF THE INVENTION a). Field of the Invention

The present invention relates to suspension control system and method for a cab over type truck, viz., apparatus and method for controlling damping force characteristics of shock absorbers applicable to the cab over type truck.

b). Description of the Related Art

A Japanese Utility Model Registration Application (unexamined) Publication No. Heisei 7-37864 published on Jul. 14, 1995 exemplifies a first previously proposed suspension control system for a cab over type truck.

The first previously proposed suspension control system includes: damping force characteristic adjustable shock absorbers mounted at a cab part of the truck; a vehicle speed sensor arranged for detecting a running speed of the cab over truck; and a control unit arranged for controlling damping forces of the respective shock absorbers on the basis of the detected running speed value of the vehicle speed sensor.

Hence, during a relatively low running speed of the cab over type truck, a soft sense of feeling due to a low frequency input from a road surface can be suppressed from occurring in each of the shock absorbers and, during a relatively high running speed of the truck, a hard sense of feeling due to a high frequency input from the road surface can be suppressed from occurring in each of the shock absorber.

On the other hand, another Japanese Utility Model Registration Application Publication No. Heisei 5-26521 published on Apr. 6, 1993 exemplifies a second previously proposed suspension control system for the cab over type truck.

The second previously proposed suspension control system includes a damping force characteristic controller which carries out a suspension of a vehicle posture variation by temporarily enlarging the damping force of the vehicular shock absorbers during a vehicular braking on the basis of a signal derived from a vehicular motion state detector; a load weight detector. Then, the damping force characteristic controller is provided with damping force characteristic control maps to be selected on the basis of an output signal of the load weight sensor.

Hence, in such a vehicle that running characteristics are largely different depending upon whether the load weight is relatively light (no load weight) or is under a standard design, a suppression of a nose dib during the vehicular braking can be assured.

SUMMARY OF THE INVENTION

However, each of the first and second previously proposed suspension control systems has the following problem to be solved.

That is to say, in a vehicle in which a tractor of a cab over type truck hauls a trailer, in order to perform an optimum cabin vibration control corresponding to vertical and longitudinal inputs from a trailer to a tractor chassis which are varied according to variations (input frequency and amplitude) on a road surface situation or a weight condition (empty load, fully loaded), it is necessary to input various information from various sensors and to make corrections for basic control signals to be supplied to the shock absorbers.

Hence, in order to suppress a pitching motion inherently present on the cabin of the cab over type truck, the whole system becomes complicated and a cost of installing the system onto the cab over type truck becomes increased.

With the above-described problem in mind, it is an object of the present invention to provide a suspension control system and method for a cab over type truck which can achieve a simplification of the system, can accurately control a behavior of a vehicle cab, and can secure a reduction of the system installation cost and comfort of a cabin.

The above-described object can be achieved by providing an apparatus for a cab over type truck, comprising: at least a pair of longitudinally spaced apart positioned shock absorbers, each shock absorber being interposed between a vehicle cab of the truck and a vehicle chassis of the truck and having a damping force characteristic varying member arranged so as to enable a variation in the damping force characteristic of its corresponding shock absorber in response to an input control signal; a vehicle cab behavior detector for detecting a behavior of the cab and for developing a signal indicative of the behavior of the vehicle cab; a basic damping force characteristic controller for developing the control signal to be supplied to the damping force characteristic varying member of each corresponding shock absorber to control the damping force characteristic of the corresponding shock absorber on the basis of a reference control rule which enables optimally a suppression of the vehicle cab behavior under a predetermined vehicle reference condition according to the vehicle cab behavior indicative signal; a pair of longitudinally spaced apart positioned vehicle cab vibration condition detector for detecting vibration conditions on at least the longitudinally spaced apart positions of the vehicle cab; a comparison value determinator for determining a comparison value which is a result of a level comparison between the level of the cab longitudinal direction vibration conditions detected by the pair of longitudinally spaced apart positions of the vehicle cab and that under a reference condition of the cab over type truck; and a corrective controller for developing a correction coefficient for the control signal to be supplied to the damping force characteristic varying member of each corresponding shock absorber so as to correct the basic damping force characteristic control for each shock absorber according to the comparison value determined by the comparison value determinator.

The above-described object can also be achieved by providing a method for controlling a damping force characteristic of at least a pair of at least a pair of longitudinally spaced apart positioned shock absorbers, each shock absorber being interposed between a vehicle cab of the truck and a vehicle chassis of the truck and having a damping force characteristic varying member arranged so as to enable a variation in the damping force characteristic of its corresponding shock absorber in response to an input control signal, the method comprising the steps of: a) detecting a behavior of the cab; b) developing the control signal to be supplied to the damping force characteristic varying member of each corresponding shock absorber to control the damping force characteristic of the corresponding shock absorber on the basis of a reference control rule which enables optimally a suppression of the vehicle cab behavior under a predetermined vehicle reference condition according to the detected vehicle cab behavior; c) detecting vibration conditions on at least the longitudinally spaced apart positions of the vehicle cab; d) determining a comparison value which is a result of a level comparison between the level of the cab longitudinal direction vibration conditions detected at the step c) of the vehicle cab and that under a reference condition of the cab over type truck; e) developing a correction coefficient for the control signal to be supplied to the damping force characteristic varying member of each corresponding shock absorber so as to correct the basic damping force characteristic control for each shock absorber according to the comparison value determined at the step d); and f) outputting the control signal which is corrected by the correction coefficient developed at the step e) to the damping force characteristic varying member of each corresponding shock absorber.

BRIEF DESCRIPTION OF THE DRAWINGS

FIG. 6 is a characteristic graph of the damping force characteristic corresponding to a stepped position of a corresponding stepping motor.

FIGS. 17A, 17B, 17C, 17D, and 17E are integrally a timing chart for the contents of the damping force characteristic control in the preferred embodiment of the suspension control system shown in FIG. 2.

BEST MODE FOR CARRYING OUT THE INVENTION

Reference will hereinafter be made to the drawings in order to facilitate a better understanding of the present invention.

Figure 1:
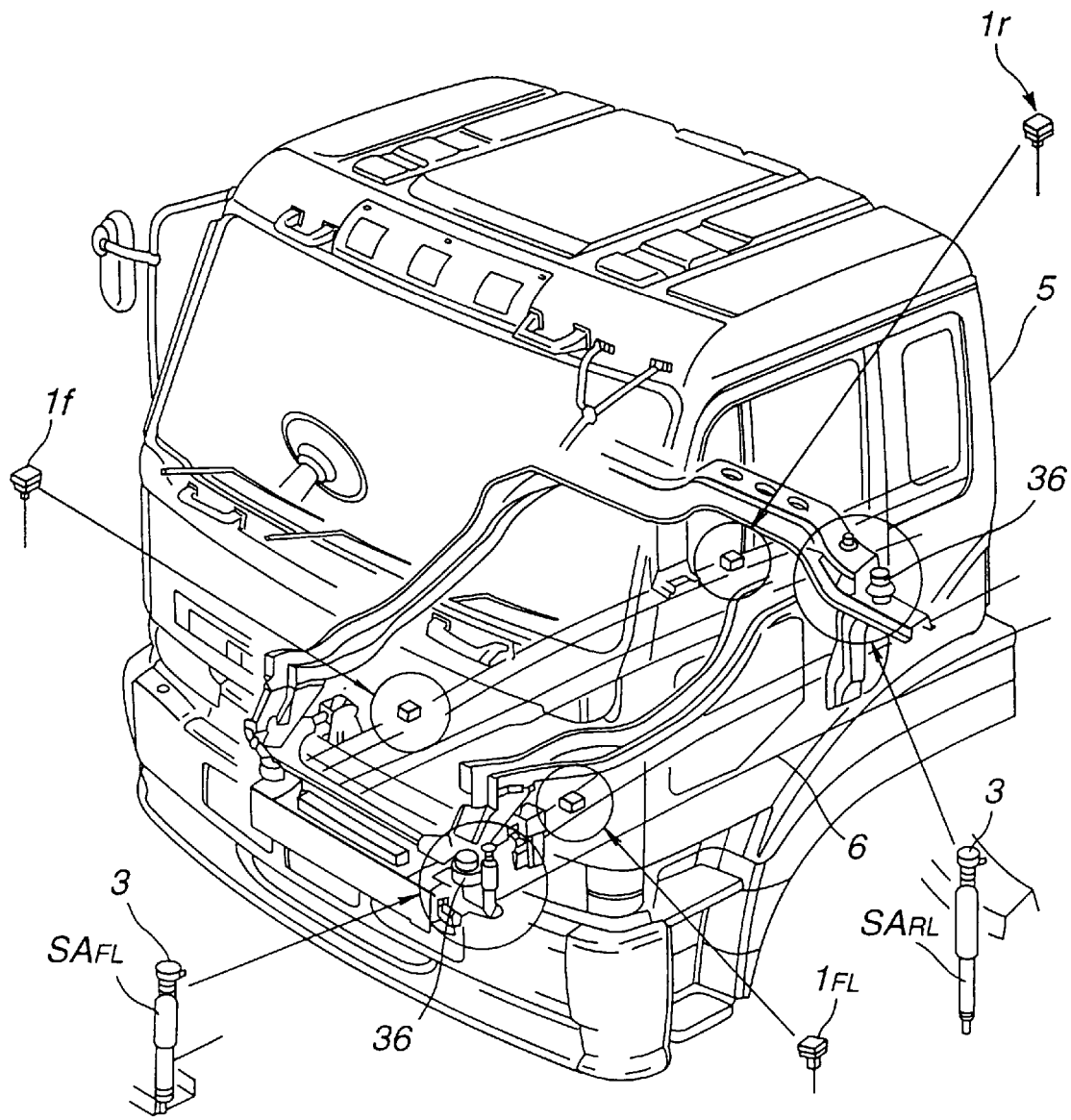
FIG. 1 is a perspective side view of a tractor of a cab over type truck to which a preferred embodiment of a suspension control system is applicable.

FIG. 1 shows an explanatory perspective view of a cab over type truck, especially, a vehicle tractor to which a suspension control system in a preferred embodiment according to the present invention is applicable.

Figure 2:
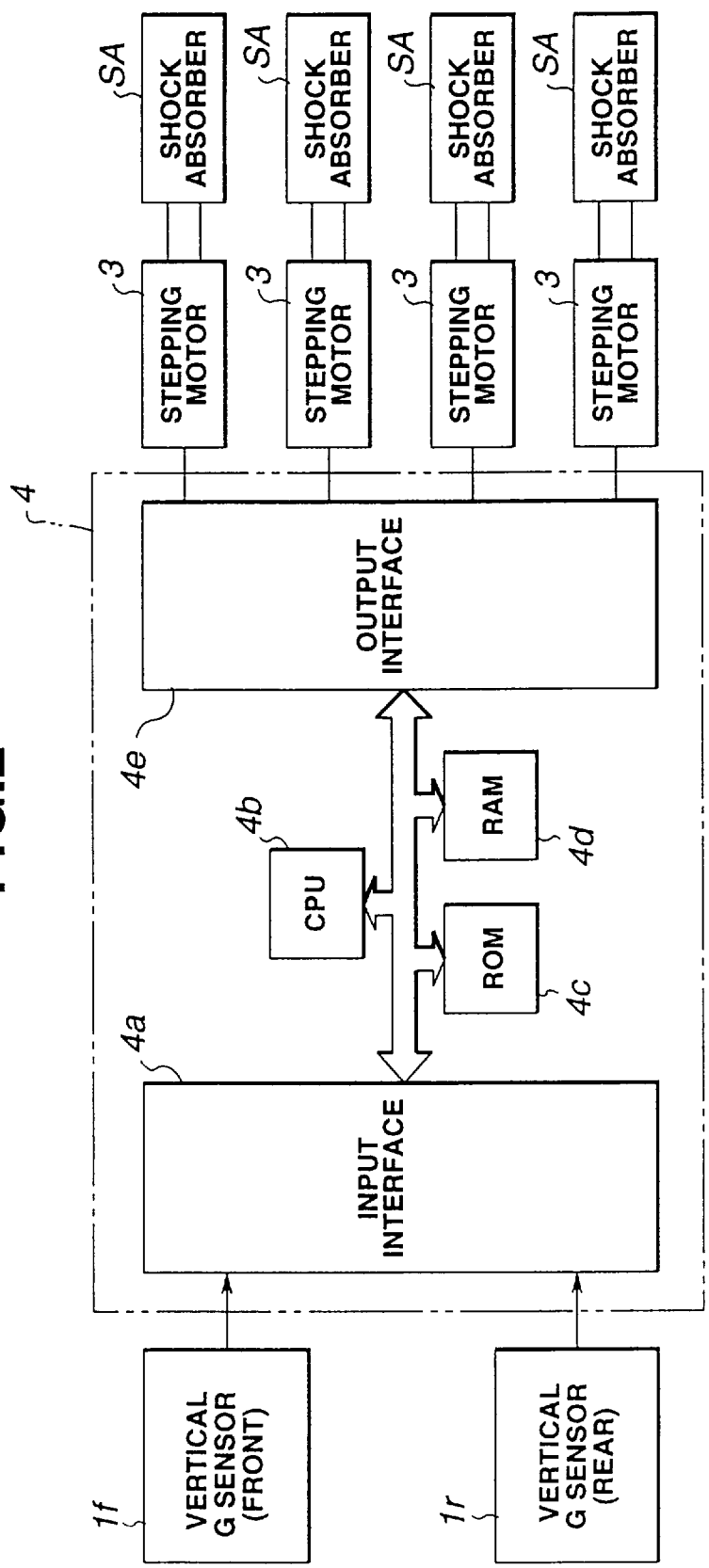
FIG. 2 is a circuit block diagram of the cab over type suspension control system shown in FIG. 1.

FIG. 2 shows a circuit block diagram of the suspension control system in the preferred embodiment shown in FIG. 1.

In FIG. 1, four shock absorbers, each shock absorber SA interposed between a cab 5 of the truck and a chassis 6 of the truck, namely, front left and right shock absorbers $SA_{FL}$ and $SA_{FR}$ and rear left and right shock absorbers $SA_{RL}$ and $SA_{RR}$ are mounted on a tractor of the cab over type truck.

In addition, each aerial spring 36 is interposed between the cab 5 and chassis 6 at a position adjacent to a corresponding one of the front left and right and rear left and right shock absorbers $SA_{FL}$, $SA_{FR}$, $SA_{RL}$, and $SA_{RR}$ and respective subscripts of FL, FR, RL, and RR denote installed positions of front left, front right, rear left, and rear right (road wheels for the cab 5).

It is noted that each shock absorber SA and each aerial spring 36 are disposed symmetrically with each other so that a right side portion thereof (a left side portion as viewed from FIG. 1) is omitted in FIG. 1 for convenience.

In addition, a pair of vertical acceleration sensors $1_f$ and $1_r$ are mounted on the cab 5 located at approximately center positions between the front left and right shock absorbers $SA_{FL}$ and $SA_{FR}$ and between the rear left and right shock absorbers for detecting vertical accelerations $G_f$ and $G_r$ (a positive value in the case of an upward motion (behavior) and a negative value in the case of a downward motion (behavior)).

Figure 3:
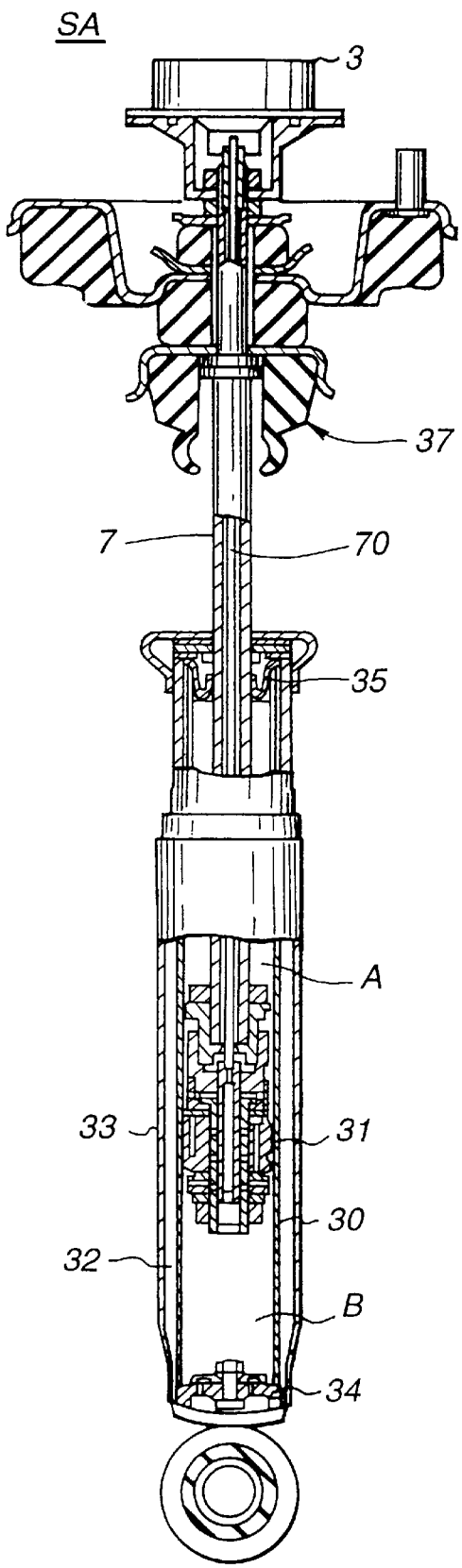
FIG. 3 is a cross sectional view of a representative shock absorber used in the cab over type suspension control system shown in FIGS. 1 and 2.

A controller 4 is, as shown in FIG. 3, installed on the truck for outputting a control signal to a stepping motor 3 associated with each corresponding shock absorber SA on the basis of output signals from the respective vertical acceleration sensors $1_f$ and $1_r$.

The controller 4 includes: an input interface 4a; a CPU (Central Processing Unit) 4b; a ROM (Read Only Memory) 4c; a RAM (Random Access Memory) 4d; an output interface 4e including a driver for each stepping motor 3, and a common bus.

The input interface circuit 4a in FIG. 2 receives sprung mass (cab 5) vertical acceleration signals $G_f$ and $G_r$ from the pair of the front and rear position vertical acceleration sensors $1_f$ and $1_r$.

Figure 13:
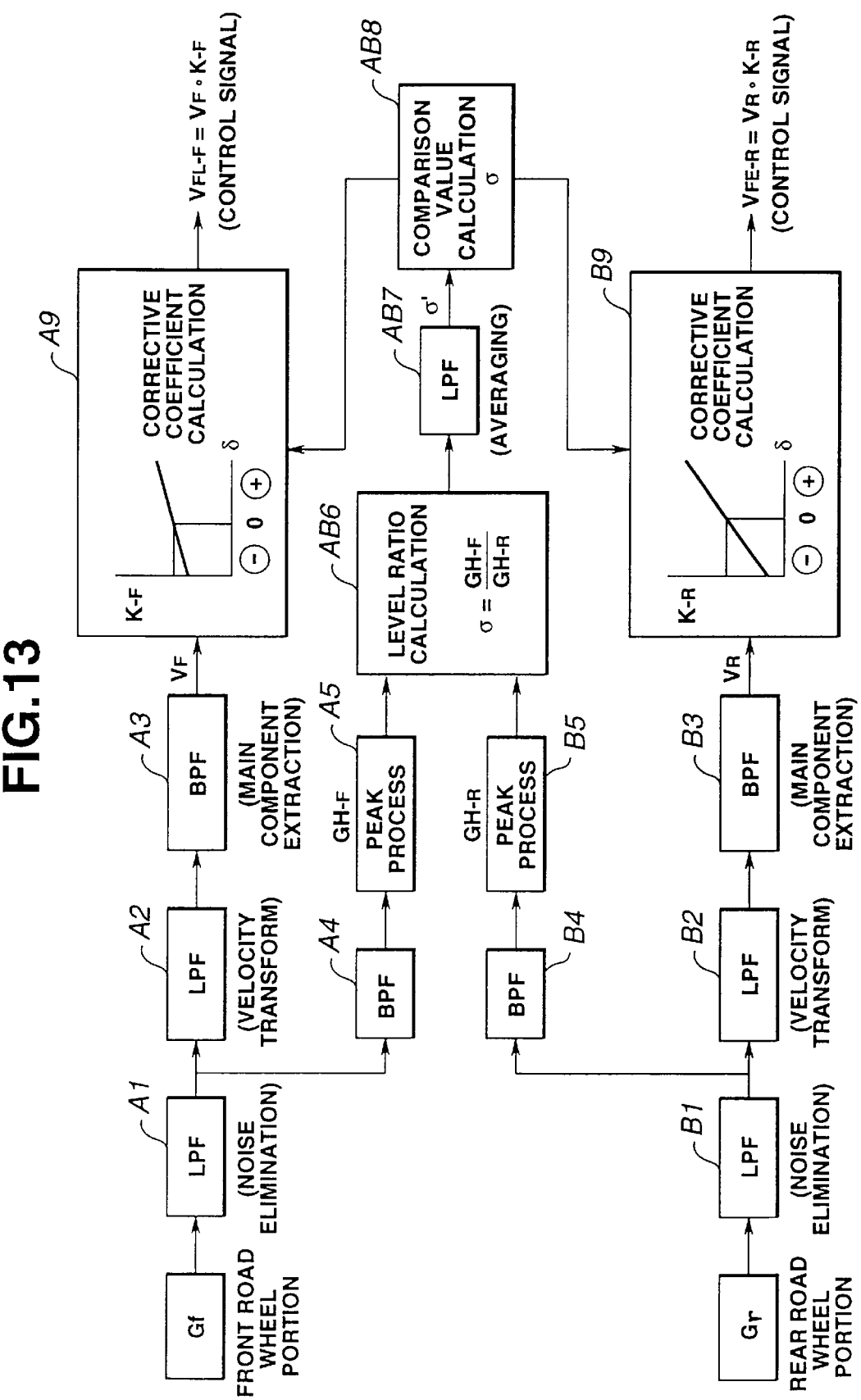
FIG. 13 is a circuit block diagram of a signal processing circuit to derive a control signal in the suspension control system shown in FIG. 2.

Then, the input interface circuit 4a, as shown in FIG. 13 (explained later), includes a signal processing circuit which develops cab front and rear position control signals $V_{EL-F}$ and $V_{EL-R}$ used to perform damping force characteristic controls for the front left and right positioned shock absorbers $SA_{FL}$ and $SA_{FR}$ and for the rear left and right positioned shock absorbers $SA_{RL}$ and $SA_{RR}$ from the sprung mass vertical acceleration signals $G_f$ and $G_r$ at the front center position of the cab 5 and at the rear center position of the cab 5, respectively. The details of the signal processing circuit will be described later.

Next, FIG. 3 shows a cross sectional view of the shock absorber SA used in the embodiment of the suspension control system according to the present invention.

The shock absorber SA includes a cylinder 30, a piston (assembly) 31 for defining an upper chamber A and a lower chamber B, an outer envelope 33 forming a reservoir chamber 32 on an outer periphery of the cylinder 30, a base 34 defining a lower chamber B and reservoir chamber 32, a guide member 35 for guiding a slidable motion of a piston rod 7 linked to the piston 31, and a bumper rubber 37.

It is noted that a representative one of the four shock absorbers $SA_{FL}$, $SA_{FR}$, $SA_{RL}$, and $SA_{RR}$ is denoted merely by SA.

Figure 4:
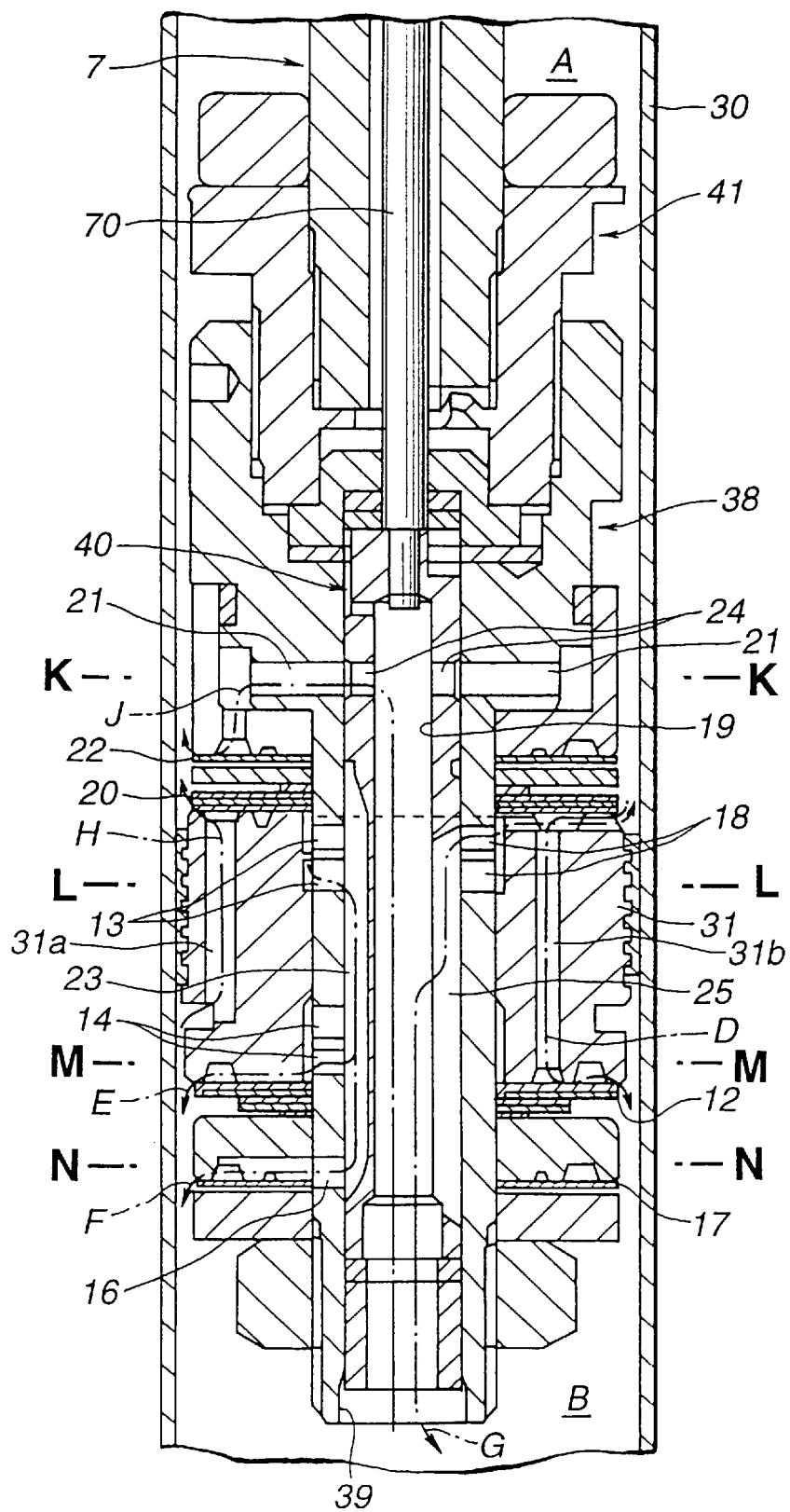
FIG. 4 is an enlarged cross sectional view of an essential part of the shock absorber shown in FIG. 3.

FIG. 4 shows an enlarged cross sectional view representing a part of the piston assembly 31 and its surrounding part of each of the shock absorbers SA.

As shown in FIG. 4, the piston 31 is formed with penetrating holes 31a and 31b therethrough. In addition, the piston 31 is provided with a compression phase attenuation valve 20 and an extension phase attenuation valve 12, both of the valves 20, 12 respectively opening and closing the respective penetrating holes 31a and 31b. A stud 38 is spirally meshed with and fixed to a bound stopper 41 spirally meshed with and fixed to a tip end of the piston rod 7.

The stud 38 is penetrated through the piston 31. In addition, the stud 38 is formed with a communication hole 39 so as to communicate with the upper portion chamber A and the lower portion chamber B. In the communication hole 39 forming flow passage (an extension phase second flow passage E, extension phase third flow passage F, bypass flow passage G, and compression phase second passage as will be described later). Then, the adjuster 40 which changes flow passage cross sectional areas of the above-described flow passage is provided within the communication hole 39.

Figure 5:
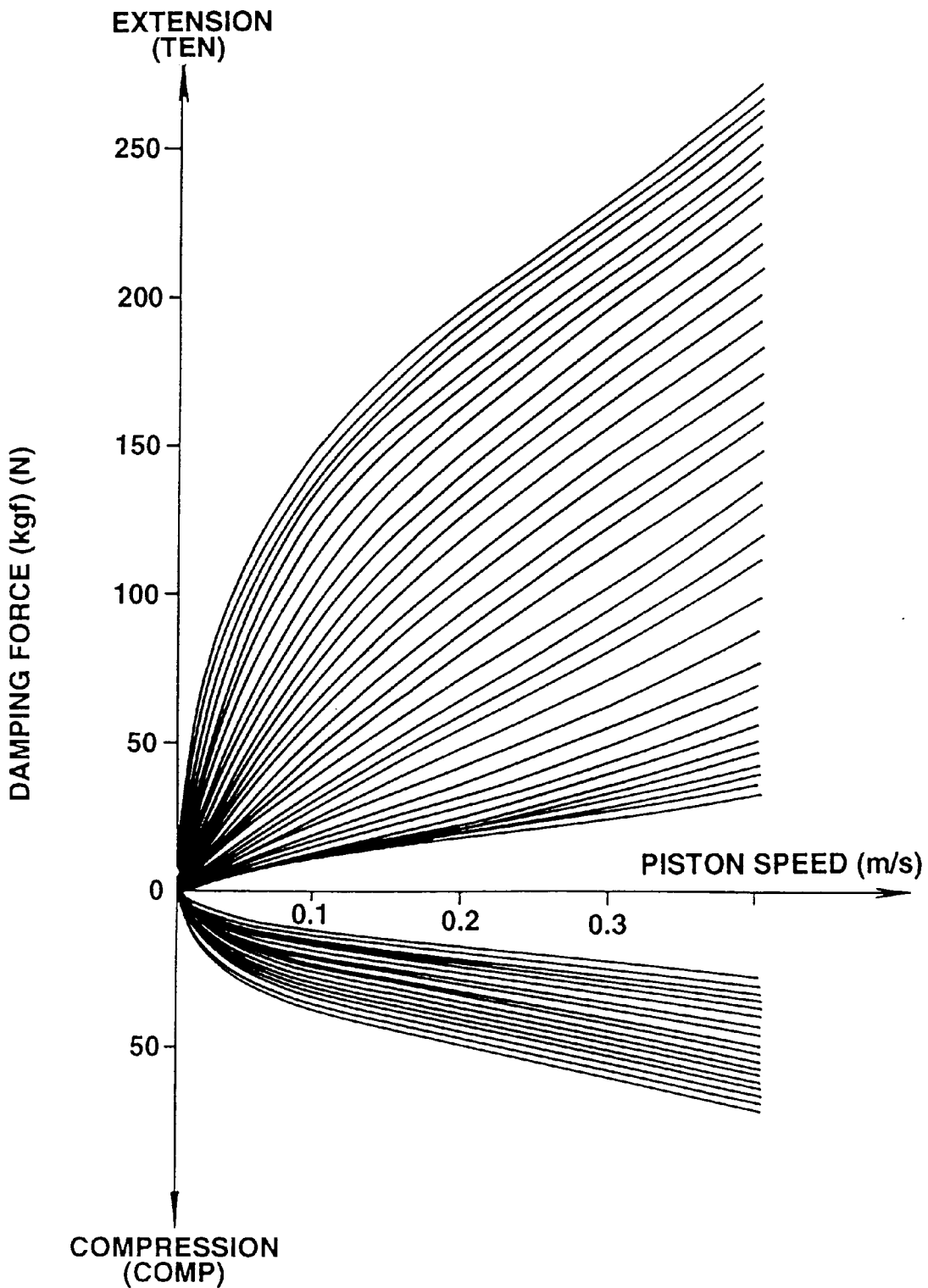
FIG. 5 is a characteristic graph representing a damping force characteristic of the representative shock absorber shown in FIG. 3 with respect to a piston speed of the shock absorber.

Furthermore, an extension phase side check valve 17 and a compression phase side check valve 22 are also installed on an outer periphery of the stud 38, which enable and disable the fluid flow through the above-described flow passages formed by the communication hole 39 in accordance with a direction of the flow of the fluid. As shown in FIG. 5, the adjuster 40 is rotatable by means of the corresponding one of the actuators (stepping motors) 3 via the control rod 70.

It is noted that the stud 38 is formed with a first part 21, a second port 13, a third port 18, a fourth port 14, and fifth port 16, respectively, in an upper order (sequence).

On the other hand, referring to FIG. 4, the adjuster 40 is formed with a hollow portion 19, a first lateral hole 24, and a second lateral hole 25, both lateral holes communicating the internal and external portions of the adjuster 40. A longitudinal groove 23 is formed on an outer peripheral portion. Hence, four flow passages are formed between the upper portion chamber A and the lower portion chamber B as the fluid flow passages when the piston stroke indicates the extension phase: namely, 1) an extension phase first flow passage D such that the fluid passes the penetrating hole 31b, a valve opened internal side of the extension phase side attenuation valve 12, and reaches the lower portion chamber B; 2) an extension phase second flow passage E in which the fluid flows through the second port 13, the longitudinal groove 23, the fourth port 14, a valve opened outer peripheral side of the extension phase side attenuation valve 12, and reaches the lower portion chamber B; 3) an extension phase side third flow passage F in which the fluid passes through the third port 18, the second internal hole 25, and the hollow portion 19 and reaches the lower portion chamber B.

In addition, the three fluid flow passages through which the fluid can be caused to flow during the compression phase side of the piston 31 includes: 1) a compression phase (stroke side) first flow passage H in which the fluid flows through the penetrating hole 31a and valve opened compression stroke side (phase) second flow passage J in which the hollow portion 19, the first lateral hole 24, the first port 21, and the opened compression phase (stroke side) check valve 22 and reaches the upper portion chamber A; and 3) the bypass passage G in which the fluid flows through the hollow portion 19, the second lateral hole 25, and the third port 18.

In summary, the shock absorber SA is so arranged and constructed as to be enabled to change the damping force characteristics at a multiple stage in its damping force characteristic, as shown in FIG. 5, either in the extension phase or compression phase when the adjuster 40 is pivoted according to the rotation of the corresponding one of the stepping motors 3.

FIG. 6 shows relationships between the rotated position of the adjuster 40 and damping force characteristics at both of the extension phase and compression phase with respect to the piston 31.

In details, as shown in FIG. 6, when the adjuster 40 is pivoted in a given counterclockwise direction from a generally center position at which both of the extension and compression phases are in soft damping force characteristic positions (also, referred to as a soft region (soft control mode) SS), the damping force coefficient at the extension phase can be changed at the multiple stage from a maximum hard to a minimum hard characteristic but the compression stroke side is fixed at a soft position (also, referred to as an extension stroke side (phase) hard region HS). On the contrary, when the adjuster 40 is pivoted in a given clockwise direction therefrom, the damping force characteristic at the multiple stages and the damping force characteristic in the compression stroke side is fixed to the soft position (also, referred to as a compression hard region (compression phase hard) SH).

Figure 7A:
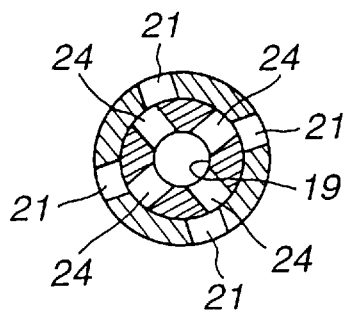
FIGS. 7A, 7B, and 7C are cross sectional views cut away along a line of K—K in FIG. 5.
Figure 7B:
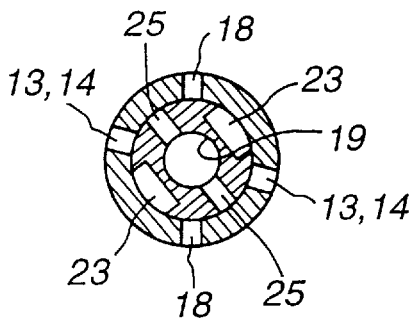
Figure 7C:
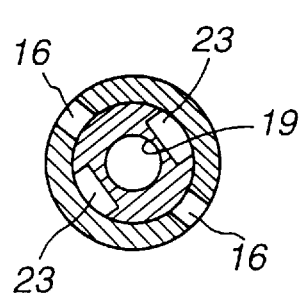
Figure 8A:
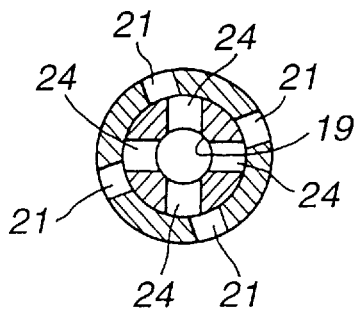
FIGS. 8A, 8B, and 8C are cross sectional views cut away along a line of L—L and a line of M—M in FIG. 5.
Figure 8B:
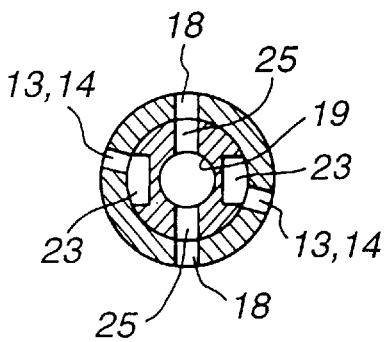
Figure 8C:
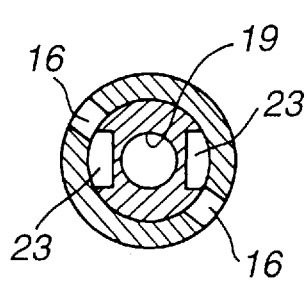
Figure 9A:
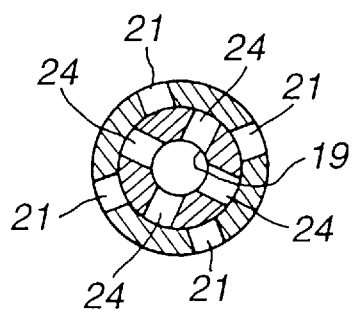
FIGS. 9A, 9B, and 9C are cross sectional views cut away along a line of N—N in FIG. 5.
Figure 9B:
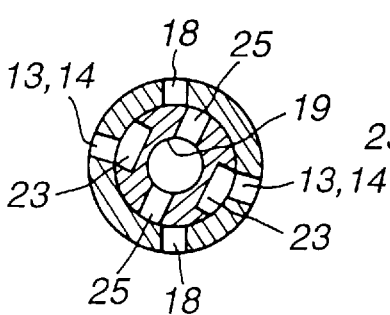
Figure 9C:
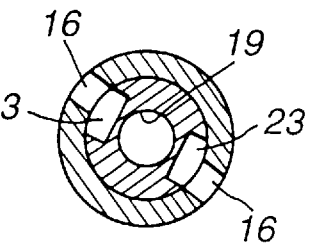

When, as shown in FIG. 6, the adjuster 40 is pivoted at any one of positions ①, ②, and ③, cross sections of the piston assembly portions cut away along lines K—K, L—L, M—M, and N—N of FIG. 4 are respectively shown in FIGS. 7A (①), 7B (②), and 7C (③) (K—K), 8A (①), 8B (②), and 8C (③) (L—L, M—M), 9A (①), 9B (②), and 9C (③) (N—N), respectively.

Figure 10:
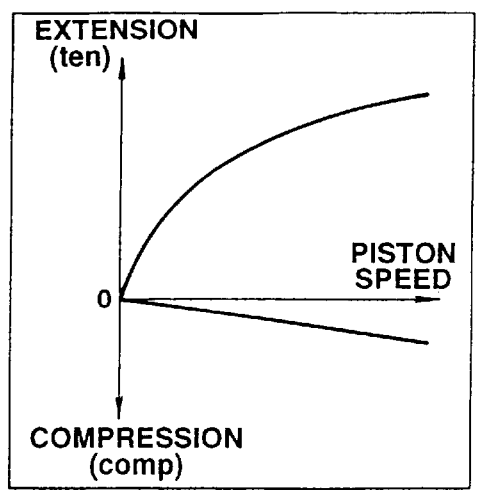
FIG. 10 is a characteristic graph representing a hard characteristic at an extension phase of the representative shock absorber shown in FIG. 5.
Figure 11:
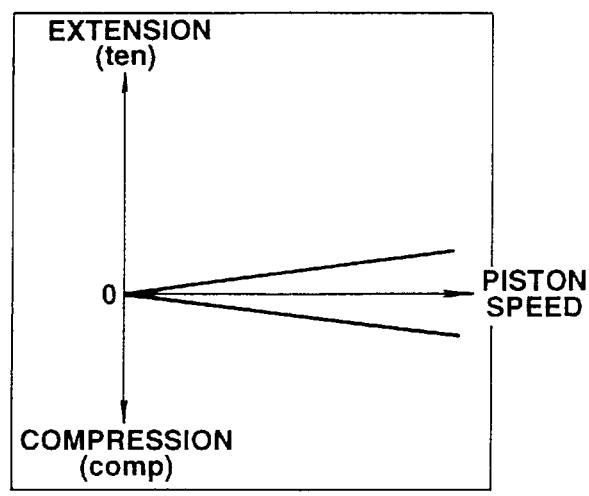
FIG. 11 is a characteristic graph representing both soft characteristics at the extension and compression phase of the respective shock absorbers.
Figure 12:
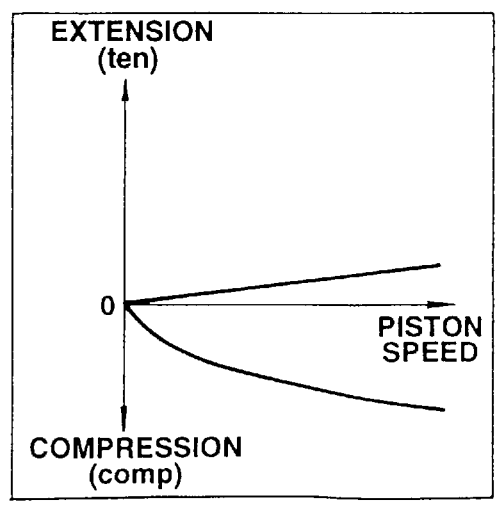
FIG. 12 is a characteristic graph representing a hard characteristic at the compression phase of the shock absorber.

The damping force characteristics at the respective portions ①, ②, and ③ shown in FIG. 6 are shown in FIGS. 10, 11, and 12, respectively.

FIG. 10 shows the damping force characteristic of the representative shock absorber SA when the adjuster 40 is positioned at ① of FIG. 6.

FIG. 11 shows that when the adjuster 40 is positioned at ② of FIG. 6.

FIG. 12 shows that when the adjuster 40 is positioned at ③ of FIG. 6.

Next, FIG. 13 shows a block structure of the signal processing circuit installed in the input interface circuit 4a of the controller 4.

The signal processing circuit shown in FIG. 13 receives the sprung mass vertical acceleration signals $G_f$ and $G_r$ of the vertical G sensors $1_f$ and $1_r$ located at front and rear positions of the cab 5 and develops the cab front position control signal $V_{EL-F}$ and $V_{EL-R}$ to perform the damping force characteristic controls for the front left and right shock absorbers $SA_{FL}$ and $SA_{FR}$ of the cab 5 and for the rear left and right shock absorbers $SA_{RL}$ and $SA_{RR}$ of the cab 5.

In details, at blocks A1 and B1 in FIG. 13, low pass filters (LPF) are provided for eliminating noises from the two sprung mass (cab 5) vertical acceleration signals $G_f$ and $G_r$ at the front center position of the cab 5 and at the rear center position of the cab 5 and at the rear center position of the cab 5 detected by the corresponding vertical G sensors $1_f$ and $1_r$, respectively.

At the subsequent blocks A2 and B2, other low pass filters (LPF) are used to convert the noise eliminated vertical acceleration signals $G_f$ and $G_r$ into corresponding sprung mass vertical velocity signals.

At the subsequent blocks A3 and B3, band pass filters (BPF) are used to extract cab front and rear position vertical velocity signals $V_f$ and $V_R$ at a sprung mass resonance frequency band from the converted sprung mass vertical velocity signals.

On the other hand, at blocks A4 and B4 subsequent to the blocks A1 and B1, band pass filters (BPF) are processed to extract peak process main components from the cab front and rear position vertical acceleration signals $G_f$ and $G_r$.

As shown in FIG. 14, low-frequency cab vertical acceleration signals Fr-g' and Rr-g' are obtained.

At blocks A5 and B5 subsequent to the blocks A4 and B4, peak value determinations are carried out to derive upward acceleration peak values $G_{PEAK-T}$ and downward acceleration peak values $G_{PEAK-C}$ of the low-frequency cab vertical acceleration signals Fr-g' and Rr-g'.

Figure 15:
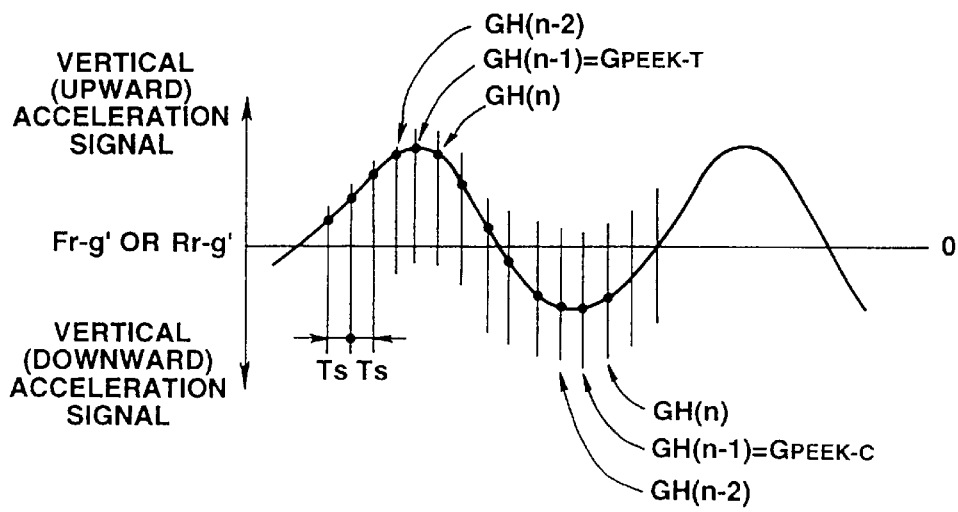
FIG. 15 is a signal waveform chart for explaining a positive peak value derivation and a negative peak value derivation of each vertical acceleration signal in the signal processing circuit shown in FIG. 13.

A method of each peak processing will be described with reference to FIG. 15.

First, respective discrete values of the low-frequency cab vertical acceleration signals Fr-g' and Rr-g' for each predetermined sampling period Ts are sampled. That is to say, in the case of the upward (positive) direction of the low-frequency cab vertical acceleration signals Fr-g' and Rr-g', a sampled value GH(n−1) before one sampling period Ts is stored in a memory location of the RAM $4d$ as an upward acceleration peak value $G_{PEAK-T}$ when the present sampled value GH(n) is smaller than the sampled value GH(n−1) before one sampling period Ts. In the case of the downward (negative) direction of the low-frequency cab vertical acceleration signals Fr-g' and Rr-g', the sampled value GH(n−1) before one sampling period Ts is stored in a memory location of the RAM $4d$ as a downward acceleration peak value $G_{PEAK-C}$ when the present sampled value GH(n) is positively larger (,i.e., negatively smaller) than the sampled value GH(n−1) before one sampling period Ts.

It is noted that the stored upward acceleration peak value $G_{PEAK-T}$ is reset when the present sampled value GH(n) indicates positive and is larger than the sampled value GH(n−1) before one period Ts and the stored downward peak value $G_{PEAK-C}$ is reset when the present sampled value GH(n) indicates negative and is smaller than the sampled value GH(n−1) before one period Ts.

Figure 14A:
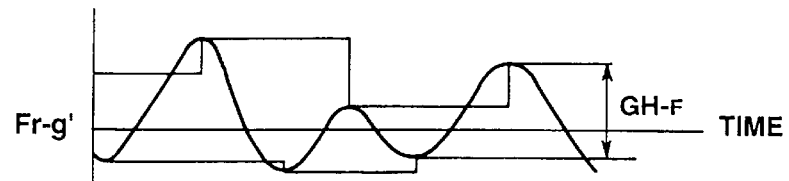
FIGS. 14A, 14B, 14C, and 14D are signal timing charts of signals outputted from respective circuits in the signal processing circuit shown in FIG. 13.
Figure 14B:
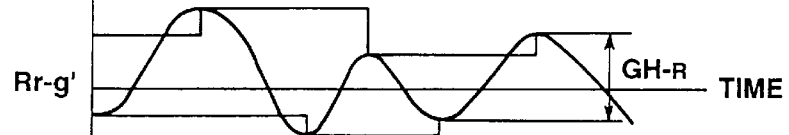
Figure 14C:
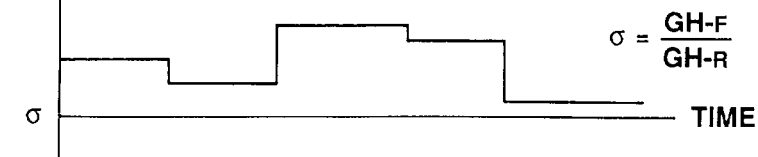

Thereafter, an absolute value of the upward acceleration peak value $|G_{PEAK-T}|$ and an absolute value of the downward acceleration peak value $|G_{PEAK-C}|$ are added. Hence, as shown in FIGS. 14A and 14B, front and rear position amplitude levels $GH_F$ and $GH_R$ are derived at the blocks A5 and B5.

Figure 14D:
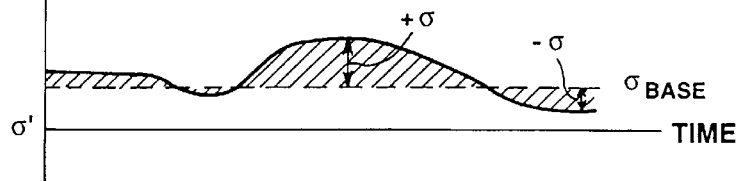

At a block AB6, the signal processing circuit calculates an vibration level ratio $\sigma$ (refer to FIG. 14C) to derive a smoothed vibration level ratio $\sigma'$ as shown in FIG. 14D. The moving average (smoothing) may generally be constituted by a low pass filter.

At a block AB8, the signal processing circuit compares the moving average processed vibration level ratio $\sigma'$ (refer to FIG. 14D) with a reference vibration level ratio $\sigma_{BASE}$ (refer to FIG. 14D) to derive a comparison value $\delta$.

It is noted that the reference vibration level ratio $\sigma_{BASE}$ is a predetermined numerical value set when the cab over type truck is under a constant vehicle condition.

The constant vehicle condition to be referenced has the following cases:

(1) Load weight is no, one cabin occupant is present, and a point of the tractor is linked to a trailing portion of the trailer (case 1).

(2) Load weight is under a standard design, two cabin occupants are present, and the point of the tractor is linked to an intermediate portion of the trailer (case 2).

(3) Load weight is at a maximum (full load), three cabin occupants are present, and the point of the tractor is linked to a leading portion of the trailer (case 3).

In the preferred embodiment, the reference vibration level $\sigma_{BASE}$ is calculated under the vehicle condition of the case 2 as the reference vehicle condition.

A calculating method thereof is basically the same as that of the smoothed vibration level ratio $\sigma'$. Hence, the detailed description of the calculating method is omitted herein.

At blocks A9 and B9 subsequent to the blocks A3, B3, and AB8, the signal processing circuit determines front and rear position correction coefficients $K_{-F}$ and $K_{-R}$ to modify a controlled variable distribution between the front and rear positions from the comparison value $\sigma$ calculated by the block AB8.

Maps of the front and rear position correction coefficients $K_{-F}$ and $K_{-R}$ are shown in FIG. 13.

That is to say, correction coefficients $K_{-F}$ and $K_{-R}$ are increased in proportion to the comparison value $\delta$.

When the comparison value $\delta$ indicates positive, the rear position correction coefficient $K_{-R}$ is larger than the front position correction coefficient $K_{-F}$.

On the other hand when the comparison value $\delta$ indicates negative, the rear correction coefficient $K_{-R}$ is smaller than the front position correction coefficient $K_{-F}$.

In this way, the front and rear position correction coefficients $K_{-F}$ and $K_{-R}$ are varied according to (,i.e., in proportion to) the comparison value $\delta$.

Hence, a vehicle pitching center is corrected according to the vehicle condition. Consequently, even if the vehicle condition is varied, the pitching motion of the cab can optimally be suppressed.

In addition, since the correction coefficients are increased in proportion to the comparison value $\delta$, a more precise corrective control is achieved according to the variation in the vehicle condition.

Then, the controller 4, viz, the signal processing circuit multiplies the front and rear position cab vertical velocity signals $V_F$ and $V_R$ calculated at the blocks A3 and B3 by the variably set front and rear position correction coefficients $K_{-F}$ and $K_{-R}$. Consequently, the optimally and precisely corrected front and rear position control signals $V_{EL-F}$ and $V_{EL-R}$ can be determined.

Figure 16:
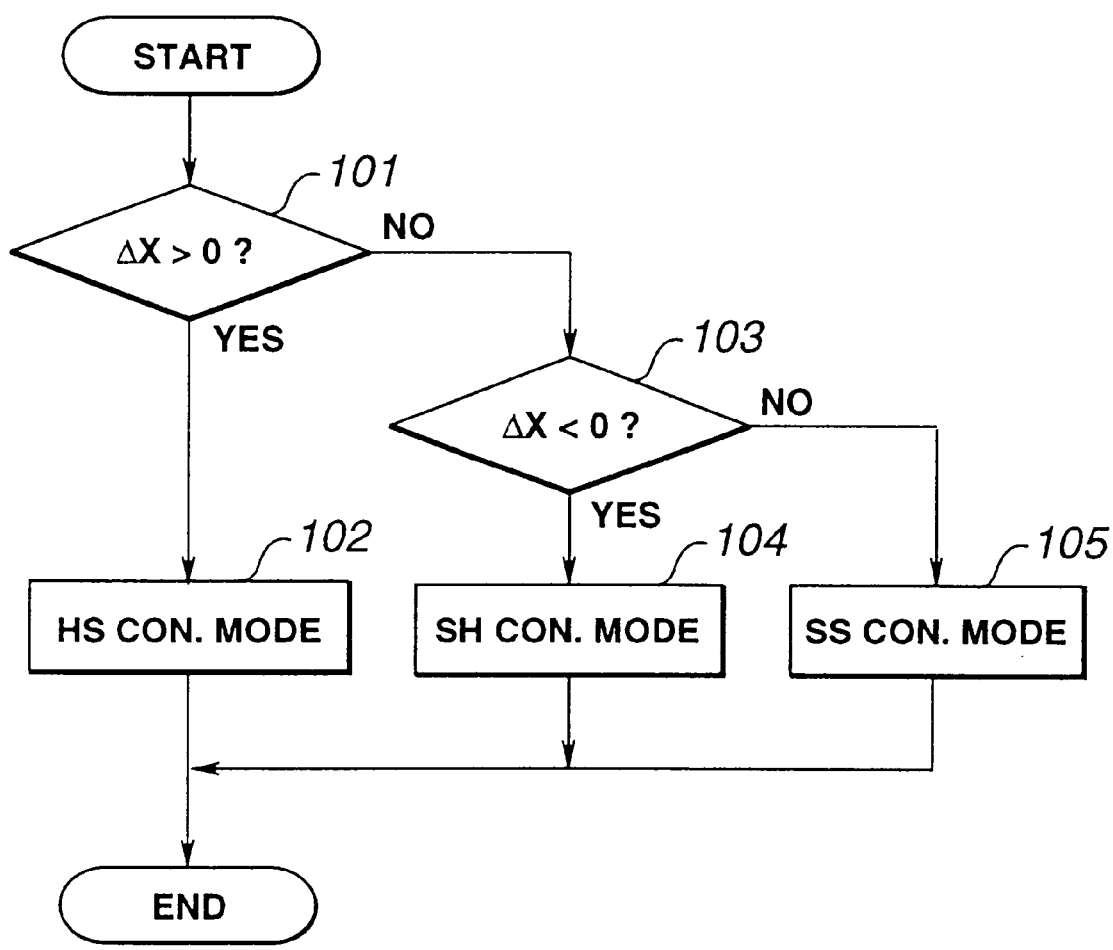
FIG. 16 is an operational flowchart representing a content of the damping force characteristic control in the preferred embodiment of the suspension control system shown in FIG. 3.

Next, FIG. 16 shows a control operation on the damping force characteristic of each shock absorber SA in the controller 4. The basic control operation is carried out for each shock absorber $SA_{FL}$, $SA_{FR}$, $SA_{RL}$, and $AS_{RR}$.

That is to say, a target damping force characteristic position P ($P_T$, $P_C$) for each shock absorber SA is calculated by the CPU $4b$ on the basis of the operational flowchart shown in FIG. 16.

At a step 101 of the flowchart in FIG. 16, the CPU $4b$ determines whether the control signal V ($V_{EL-F}$ and $V_{EL-R}$)

based on the sprung mass vertical velocity signals Δx ($V_F$ and $V_R$) indicates positive.

If V>0 at the step 101, the routine goes to a step 102 in which the CPU 4b is operated to control each shock absorber SA to the extension phase hard region HS. If the CPU 4b determines that V≦0 at the step 102, the routine goes to a step 103 in which the CPU 4b determines whether V<0.

If Yes at the step 103, the routine goes to a step 104 in which the CPU 4b controls each shock absorber SA to the compression phase hard region SH.

If No at the step 103 (V=0), the routine goes to a step 105 in which the CPU 4b controls each shock absorber SA to both of the compression and extension phases in SS mode (soft and soft).

That is to say, if the control signal V is varied as shown in timing charts shown in FIGS. 17A, 17B, 17C, 17D, and 17E, the shock absorbers SA are controlled in the soft region SS when the signal value V is zeroed.

In addition, when the control signal V indicates positive, the extension phase hard region HS is controlled so that the damping force characteristic at the compression phase is fixed to the soft characteristic and the damping force characteristic at the extension phase constituting the control signal (target damping force characteristic position $P_T$) is varied in proportion to the control signal V based on the following equation (10).

$$P_T = \delta T \cdot V \quad (10).$$

In the equation (10), δT denotes a constant at the extension phase.

In addition, if the value of the control signal V indicates negative, the control is returned to the compression phase hard region SH to modify the compression phase damping force characteristic (target damping force characteristic PC) in proportion to the control signal V on the basis of the following equation (11).

$$P_C = \delta C \; V \quad (11).$$

In the equation (11), δC denotes a constant at the compression phase.

Next, FIGS. 17A through 17E integrally show the timing chart for explaining a switching operation state in a controllable region of the representative shock absorber SA in the damping force characteristic control operation of the control unit 4.

As shown in timing charts of FIG. 17A through 17E, the region a denotes a state wherein the control signal V based on the sprung mass vertical velocity is reversed from a negative value (upward) to a positive value (downward). At this time, since the relative velocity between the sprung mass (cab 5) and the unsprung mass (chassis 6) indicates the negative region (the compression phase side toward which the shock absorber SA strokes) on the basis of the direction of the control signal V, the compression stroke side which is the stroke of the shock absorber SA indicates the soft characteristic.

In addition, the region b indicates the region switched from the negative value to the positive value (extension stroke side toward which the shock absorber SA strokes) on the relative velocity between the sprung mass and the unsprung mass with the control signal V being still left to indicate the positive value(upward). At this time, the shock absorber SA is controlled at the extension phase hard region SH on the basis of the direction of the control signal V. In addition, since the stroking phase of the shock absorber SA is also in the extension phase, hence, the extension stroking phase of the shock absorber SA indicates the hard characteristic in proportion to the value of the control signal V.

In addition, the region c is a state wherein the control signal V is reversed from the positive value (upward) to the negative value (downward). At this time, since the relative velocity between the sprung mass and unsprung mass indicates positive (extension phase side of the stroke of the shock absorber SA), the shock absorber SA is controlled to the compression phase hard region SH on the basis of the direction of the control signal V. Hence, at the region thereof, the compression phase side of the shock absorber SA indicates the hard characteristic in proportion to the value of the control signal V.

Furthermore, at the region of d, since this region d is the region in which the relative velocity ($\Delta x - \Delta x_0$) indicates the switching from the positive value to the negative value (the stroking phase of each corresponding shock absorber SA is the extension phase), the control signal V remaining indicating the negative value (downward), each corresponding shock absorber SA based on the direction of the compression phase hard region (SH region) and the stroke direction of each control signal V is the compression phase. Hence, at this region of d, the compression phase which each corresponding shock absorber SA strokes provides the hard characteristic in proportion to the value of the control signal V.

As described above, in the embodiment according to the present invention, when the sign of the control signal V and the sign of the relative velocity between the sprung mass and the unsprung mass are the same signs (region b and the region d), the stroking side of the shock absorber SA is controlled to the hard characteristic. When the signs described above are different (the region a and the region a) from each other, the instantaneous shock absorber SA falls in the soft characteristic. The same control as the damping force characteristic based on the Skyhook (control) theorem is carried out only by means of the control signal V.

In addition, when the stroking position of the shock absorber SA is switched, namely, the control is transferred from the region a to the region b, namely, from the region c to the region d (from the soft characteristic to the hard characteristic), the damping force characteristic position at the switching stroke side is already carried out at the regions a and a so that the switching from the soft characteristic to the hard characteristic is carried out without delay in time. Consequently, the high control responsive characteristic is achieved and the switching between the hard characteristic to the soft characteristic is carried out without the drive of the corresponding one of the stepping motors 3. Thus, the durability of each stepping motor 3 and the saving of the consumed power can be improved.

The cab suspension control system in the preferred embodiment has the following points of merits.

(1) Since the basic control signals $V_f$ and $V_r$ derived from the sprung mass vertical acceleration signals $G_f$ and $G_r$ on the front and rear positions of the cab 5 are corrected by the front and rear correction coefficients $K_{-F}$ and $K_{-R}$ which are derived on the basis of the comparison value of δ. The comparison value δ is based on the comparison result between the vibration level ratio σ' of the front and rear position of the cab 5 and the reference vibration level ratio a $\sigma_{BASE}$ set under the constant vehicle condition. The front and rear position correction coefficients $K_{-F}$ and $K_{-R}$ are variably set in proportion to the comparison value δ. The pitching center is corrected according to the vehicle condition so that the cab pitching behavior can always and optimally be suppressed although the vehicle condition is varied, the stability and comfort of the cab 5 can be assured.

(2) Since the correction coefficients $K_{-R}$ and $K_{-F}$ are increased in proportion to the value of the comparison value δ, a more precise control of the damping force characteristic of each shock absorber SA can be achieved.

(3) Since only the pair of front and rear position vertical G sensors $1_f$ and $1_r$ are installed so that all control signals are derived, the system installation cost would be decreased.

(4) Since, in the damping force characteristic control based on the Skyhook theorem, the switching from the soft characteristic to the hard characteristic can be carried out without delay in time, the high control responsive characteristic can be achieved without the drive of an actuator (each corresponding stepping motor 3). Hence, the durability of each stepping motor 3 can be achieved and a saving of the power consumption can be achieved.

In the preferred embodiment, the cab behavior detector includes the pair of front and rear position vertical G sensors $1_f$ and $1_r$ located at the center positions of the front and rear positions of the cab 5. However, the vertical G sensors may be installed at positions adjacent to the front left or right position shock absorber $SA_{FL}$ or $SA_{FR}$ or may be installed at positions adjacent to the rear left or right position shock absorber $SA_{RL}$ or $SA_{RR}$.

Figure 18:
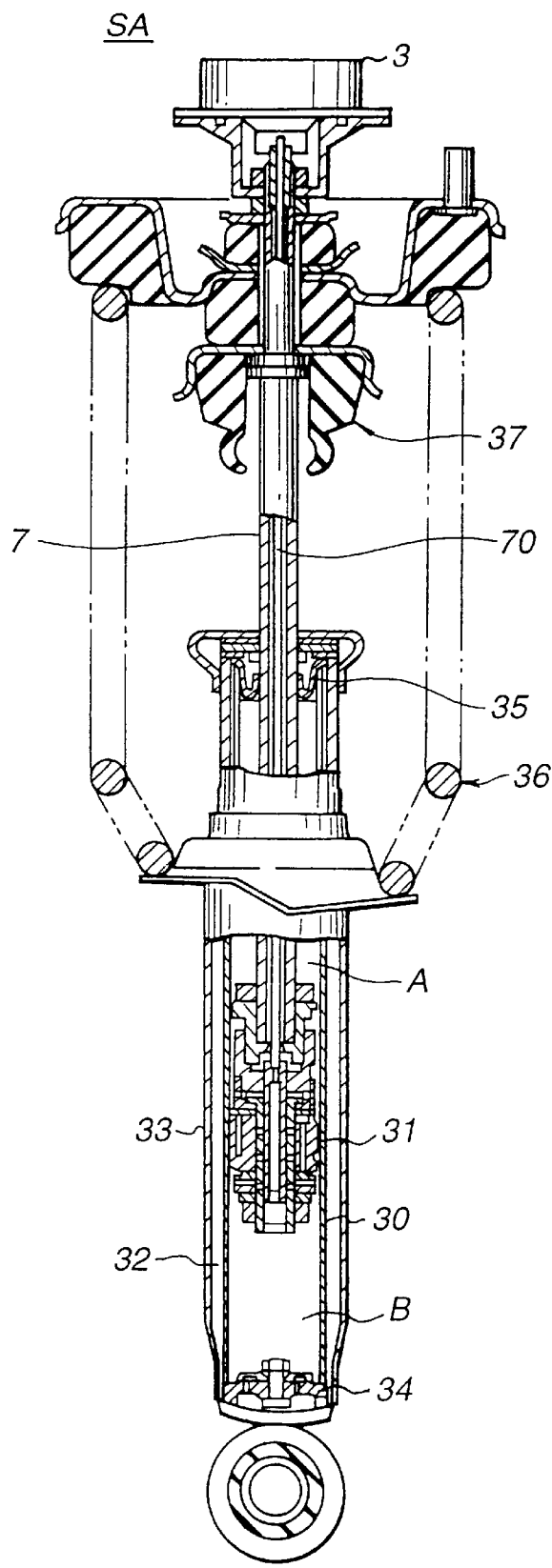
FIG. 18 is a cross sectional view of another shock absorber in which a suspension spring is used in place of an aerial spring shown in FIG. 1.

In the preferred embodiment, as shown in FIG. 1, the aerial spring 36 is provided adjacent to each shock absorber SA. As shown in FIG. 18, a suspension spring denoted by 36 in FIG. 18 may be installed on each corresponding shock absorber SA.

In addition, in the preferred embodiment, the soft region (SS) in each of the extension and compression phases is set only when the control signal V ($V_{EL-F}$ and $V_{EL-R}$) is zeroed. However, a predetermined dead zone may be provided with the zero control signal V as the center. While the control signal V falls within the range in the dead zone, the damping force characteristic is maintained at the soft region SS so that a control hunting can be prevented.

In the preferred embodiment, each shock absorber SA is used in which the damping force characteristic in one of the extension and compression phases is fixed to provide the soft damping force characteristic in the other of the extension and compression phases is variably controlled to provide the hard characteristic. The present invention is applicable to a suspension control system having such each of the other types of the shock absorbers that the damping force characteristics in both of the extension and compression phases are simultaneously varied may be used. Such other types of the shock absorbers as described above are exemplified by a U.S. Pat. No. 5,497,863 issued on Mar. 12, 1996, the disclosure of which is herein incorporated by reference.

Figure 17A:
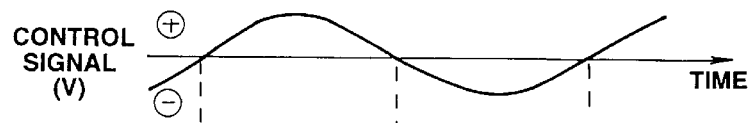
Figure 17B:
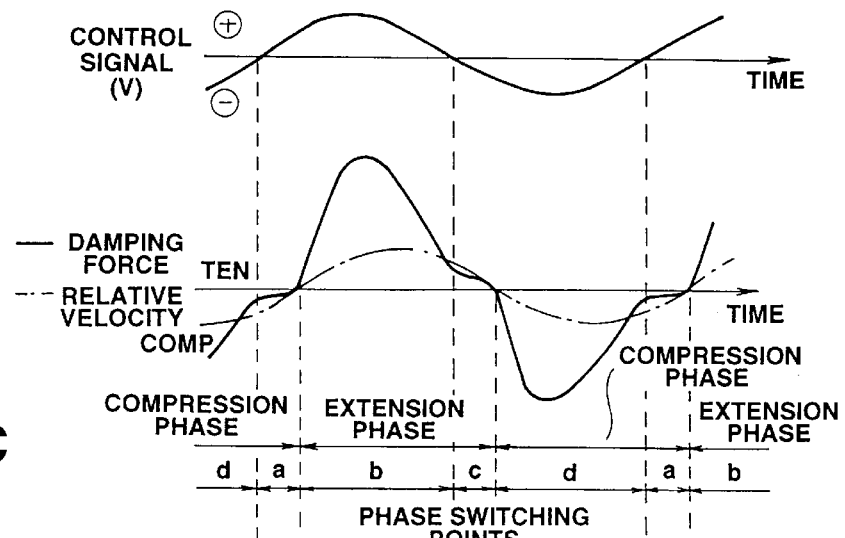
Figure 17D:
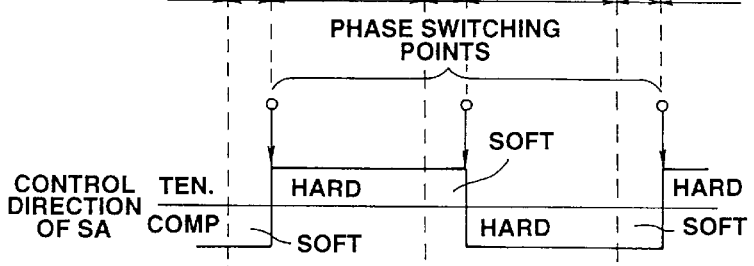
Figure 17E:
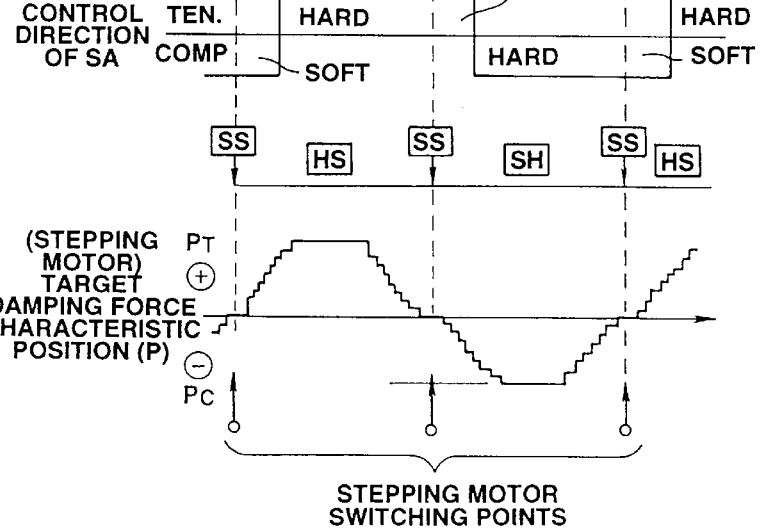

It is noted that TEN in FIG. 17B denotes the extension phase and COMP in FIG. 17B denotes the compression phase.

What is claimed is:

1. An apparatus for a cab over type truck, comprising:

at least a pair of longitudinally spaced apart positioned shock absorbers, each shock absorber being interposed between a vehicle cab of the truck and a vehicle chassis of the truck and having a damping force characteristic varying member arranged so as to enable a variation in the damping force characteristic of its corresponding shock absorber in response to an input control signal;

a vehicle cab behavior detector for detecting a behavior of the cab and for developing a signal indicative of the behavior of the vehicle cab;

a basic damping force characteristic controller for developing the control signal to be supplied to the damping force characteristic varying member of each corresponding shock absorber to control the damping force characteristic of the corresponding shock absorber on the basis of a reference control rule which enables optimally a suppression of the vehicle cab behavior under a predetermined vehicle reference condition according to the vehicle cab behavior indicative signal;

a pair of longitudinally spaced apart positioned vehicle cab vibration condition detectors for detecting vibration conditions on at least the longitudinally spaced apart positions of the vehicle cab based on the vehicle cab behavior indicative signal;

a comparison value determinator for determining a comparison value which is a result of a level comparison between the level of the cab longitudinal direction vibration conditions detected by the pair of longitudinally spaced apart positioned vehicle cab vibration condition detectors of the vehicle cab and that under a reference condition of the cab over type truck; and a corrective controller for developing a correction coefficient for the control signal to be supplied to the damping force characteristic varying member of each corresponding shock absorber so as to correct the basic damping force characteristic control for each shock absorber according to the comparison value determined by the comparison value determinator.

2. An apparatus for a cab over type truck as claimed in claim 1, wherein the pair of the longitudinally spaced apart positioned shock absorbers are located at front and rear positions of the vehicle cab, the vehicle cab behavior detected by the cab behavior detector is a vehicle cab vertical velocity, and the vibration conditions detected by the pair of the vehicle cab vibration detectors are magnitudes of vehicle cab vertical accelerations at the front and rear positions of the cab.

3. An apparatus for a cab over type truck as claimed in claim 2, wherein the corrective controller develops a front position correction coefficient for the control signal to be supplied to the damping force characteristic varying member of the corresponding front positioned shock absorber and develops a rear position correction coefficient for the control signal to be supplied to the damping force characteristic varying member of the corresponding rear positioned shock absorber, the rear position correction coefficient being larger than the front position correction coefficient when the comparison value determined by the comparison value determinator indicates positive and being smaller than the front position correction coefficient, when the comparison value determined by the comparison value determinator indicates negative.

4. An apparatus for a cab over type truck as claimed in claim 3, wherein each of the front and rear position correction coefficients is varied according to a magnitude of the comparison value.

5. An apparatus for a cab over type truck as claimed in claim 4, wherein a dead zone is provided in the damping force characteristic control by the basic damping force characteristic controller, a magnitude of the dead zone being varied according to the magnitude of each of the correction coefficients.

6. An apparatus for a cab over type truck as claimed in claim 1, wherein the vehicle cab behavior detector comprises a pair of vertical acceleration sensors located at front and rear positions of the vehicle cab for detecting vertical accelerations at the front and rear positions of the vehicle cab and for developing front and rear position vertical acceleration signals (Gf and Gr) of the vehicle cab and the pair of longitudinally spaced apart vibration condition detectors comprise: a pair of band pass filters through which the front and rear positioned vertical acceleration signals have passed to derive low-frequency cab front and rear position vertical acceleration signals (Fr-g', Rr-g'); a pair of peak detectors for detecting absolute values of positive and negative peak values ($|G_{PEAK-T}|$ and $|G_{PEAK-C}|$) of the low-frequency cab vertical acceleration signals (Fr-g', Rr-g') whenever a predetermined sampling period has passed; and a pair of adders for adding the absolute values of the peak values of the front and rear positioned vertical acceleration signals (Fr-g', Rr-g') to derive a cab front position vibration level (GH-F) and a cab rear vibration level (GH-R) of the cab.

7. An apparatus for a cab over type truck as claimed in claim 6, wherein the comparison value determinator comprises: a calculator for calculating an amplitude level ratio ($\sigma$) from the front positioned vibration level (GH-F) and the rear positioned vibration level (GH-R); a smoother for smoothing the calculated vibration level ratio ($\sigma$) of the calculator to derive a smoothed vibration level ratio ($\sigma'$); a comparator for comparing the smoothed vibration level ratio ($\sigma'$) with a reference vibration level ($\sigma_{BASE}$) to derive a comparison value ($\delta$).

8. An apparatus for a cab over type truck as claimed in claim 7, wherein the corrective controller develops a front correction coefficient ($K_{-F}$) and a rear correction coefficient ($K_{-R}$) according to the derived comparison value ($\delta$) by the comparison value determinator.

9. An apparatus for a cab over type truck as claimed in claim 8, wherein the corrective controller develops the front and rear correction coefficients ($K_{-F}$ and $K_{-R}$) in proportion to a magnitude of the comparison value ($\delta$) and a magnitude of the rear correction coefficient being larger than that of the front correction coefficient.

10. An apparatus for a cab over type truck as claimed in claim 9, which further comprises vehicle cab front and rear position vertical velocity determinators for determining vehicle cab front and rear position vertical velocities ($V_F$ and $V_R$) according to the vehicle cab front and rear position vertical acceleration indicative signals and according to the front and rear corrective coefficients ($K_{-F}$ and $K_{-R}$) developed by the corrective controller as follows: $V_{EL-F}=V_F{}^*K_{-F}$ and $V_{EL-R}=V_R{}^*K_{-R}$.

11. An apparatus for a cab over type truck as claimed in claim 7, wherein the reference vibration level ($\sigma_{BASE}$) is derived when the cab over type truck is under a vehicle condition such that a load weight is a design standard, two cabin occupants are present in a cabin, and a point of the cab linked to an intermediate point of a vehicle trailer.

12. A method for controlling a damping force characteristic of at least a pair of longitudinally spaced apart positioned shock absorbers, each shock absorber being interposed between a vehicle cab of the truck and a vehicle chassis of the truck and having a damping force characteristic varying member arranged so as to enable a variation in the damping force characteristic of its corresponding shock absorber in response to an input control signal, the method comprising the steps of:

a) detecting a behavior of the cab;

b) developing the control signal to be supplied to the damping force characteristic varying member of each corresponding shock absorber to control the damping force characteristic of the corresponding shock absorber on the basis of a reference control rule which enables optimally a suppression of the vehicle cab behavior under a predetermined vehicle reference condition according to the detected vehicle cab behavior;

c) detecting vibration conditions on at least the longitudinally spaced apart positions of the vehicle cab;

d) determining a comparison value which is a result of a level comparison between the level of the cab longitudinal direction vibration conditions detected at the step c) of the vehicle cab and that under a reference condition of the cab over type truck;

e) developing a correction coefficient for the control signal to be supplied to the damping force characteristic varying member of each corresponding shock absorber so as to correct the basic damping force characteristic control for each shock absorber according to the comparison value determined at the step d); and f) outputting the control signal which is corrected by the correction coefficient developed at the step e) to the damping force characteristic varying member of each corresponding shock absorber.

* * * * *